United States Patent [19]
Quackenbush

[11] 3,802,792
[45] Apr. 9, 1974

[54] POSITIVE FEEDING STRUCTURE WITH PROGRAMMED SPINDLE SPEED CONTROL

[75] Inventor: Robert C. Quackenbush, Glendale, Calif.

[73] Assignee: Arthur B. Quackenbush, Glendale, Calif. ; a part interest

[22] Filed: Dec. 4, 1972

[21] Appl. No.: 311,514

[52] U.S. Cl. .............................. 408/130, 408/137
[51] Int. Cl. .................... B23b 47/08, B23b 47/22
[58] Field of Search ........................... 408/130, 137

[56] References Cited
UNITED STATES PATENTS
3,552,238   1/1971   Quackenbush ................... 408/130

*Primary Examiner*—Francis S. Husar
*Attorney, Agent, or Firm*—Mahoney, Schiek & Cislo

[57] ABSTRACT

A spindle and coaxial lead screw are movable axially in feed and retraction strokes, the lead screw controlling the axial movement during a feed stroke working portion. The spindle and lead screw are rotatably driven by a fluid motor, the lead screw speed a proportion of the spindle speed, and the drive motor speed is controlled between preset fast and slow rates by a selectively shiftable regulator controlling fluid supply to the drive motor. A control plate is carried directly with the spindle in axial movement and engages fluid valves to appropriately shift the drive motor regulator for prorammed rotational speed changing of the spindle and otherwise automatically controlling the spindle feed and retraction cycle.

21 Claims, 14 Drawing Figures

POSITIVE FEEDING STRUCTURE WITH PROGRAMMED SPINDLE SPEED CONTROL

BACKGROUND OF THE INVENTION

This invention relates to a positive feeding structure with programmed spindle speed control and more particularly, to a positive feeding structure wherein various fluid valves means are actuated on a preset and programmed basis as directly mechanically related to the spindle axial movement for shifting the speed of rotation of the spindle repeatedly between slow and fast rates to carry out a predetermined working schedule and overall work operation. In the preferred form of the present invention, two novel concepts are incorporated therein. One concept involves the repeated variation of spindle rotational speed between preset speed rates and on a programmed basis accomplished by a control member carried axially directly with the spindle throughout the spindle feed and retraction cycle acting on fluid valves preset to carry out said speed of rotation regulation programming. The other novel concept involves the control of the spindle rotational speed by controlling directly from the spindle axial movements, the fluid supply to a fluid driven motor which rotates the spindle during the spindle feed and retraction cycle.

Certain prior forms of positive feeding structures have heretofore been provided none of which, however, include the foregoing novel concepts to my knowledge. An example of such a recent prior construction is disclosed in my prior U. S. Pat. No. 3,552,238, issued Jan. 5, 1971 and entitled "STRUCTURE FOR POSITIVELY FEEDING TOOLS SUCH AS DRILLS AND THE LIKE." The general arrangement of the positive feeding structure of my said prior patent is similar to that of the present invention in many respects, but particularly with the exception of the programmed spindle speed control of the present invention. Thus, the positive feeding structure of the present invention constitutes an improvement on the similarly arranged structure of my said prior patent.

In the positive feeding structure of said prior patent, a form of control member was tied for axial movement with the axial movement of the spindle in its feed and retraction strokes. This control member is arranged for engaging and actuating fluid valves to effect the control of the spindle axial movement by the lead screw during a portion of the spindle feed stroke, and also to terminate the feed stroke and commence the retraction or return stroke. During the entire movement of the spindle axially in its feed and retraction strokes, the spindle is rotated at a preset constant speed or rate of rotation.

It has been found, however, that certain working operations capable of being carried out by and requiring positive feeding structures, such as drilling operations, are more efficiently and precisely performed at varying rotational speeds, that is, first one rotational speed at a beginning of the drilling operation, then another and then back to the first or even another, all combined to make up the total working operation. For instance, in a typical drilling operation which must culminate in precisely drilled holes including precise depth of holes, it is desirable to begin the drilling operation at a slow rotational speed for greater accuracy of location, increase the rotational speed once the drill holes has been initially established for reducing the overall drilling time, and then again reduce the rotational speed just prior to the completion of the drilled hole in order to provide maximum accuracy of depth of the finished drilled hole.

It is evident that certain of these desirable spindle rotational speed changes could be manually controlled by an operator. This, however, would require the full attention of an operator for every drilling operation and throughout the total extent of such drilling operation. Even then, the final drilled hole might not be accomplished with the spindle rotational speed changes controlled at the proper time and these speed changes would certainly occur over a wide range of time limit periods during repeated identical drilling cycles.

OBJECTS AND SUMMARY OF THE INVENTION:

It is, therefore, an object of this invention to provide a positive feeding structure with programmed spingle speed control wherein by the provision of a series of particular and preset fluid valves controlled directly and exactly from spindle axial movement, it is possible to program the structure for precise spindle speed changes and maintenance according to an exact predetermined pattern in carrying out an effective and efficient working cycle. According to the principles of the present invention, a control member operably connected to the spindle movable exactly with the spindle in the spindle axial feed and retraction strokes engages a series of preset fluid valves which effect the spindle speed changes to alter and maintain the spindle rotational speed exactly according to the determined programming throughout the spindle feed and retraction strokes. The fluid valves are preferably constructed for selective adjustment in order to preset the control member engagement thereof and actuation at the exact moment according to the particular programming so as to permit changes in the programming after the original construction of the positive feeding structure according to particular requirements.

It is a further object of this invention to provide a positive feeding structure with programmed spindle speed control wherein by the use of a particular preferred arrangement of the positive feeding structure of the present invention, at least during a portion of the programmed spindle sped changing, the axial feed rate of the spindle is likewise proportionately controlled by the same mechanism controlling the rate of spindle rotational speed so as to result in a proportionate increase in spindle feed rate for an increase in spindle rotational speed and a proportionate decrease in spindle feed rate for a decrease in spindle rotational speed. Again, according to a preferred form of the positive feeding structure of the present invention a lead screw controlling and precisely determining the axial feed rate of the spindle during at least a portion of the spindle feed stroke, is mounted coaxial with the spindle for simultaneous axial movement with the spindle during the feed and retraction strokes. Furthermore, the lead screw is rotatably driven exactly with the rotatable drive of the spindle and at an exact proportional speed thereof. Thus, during the control of the spindle axial feed by the lead screw during the spindle feed stroke, a change in spindle rotational speed will automatically change the lead screw rotational speed and consequently, the rate of spindle axial feed, all in the predetermined proportions.

It is still a further object of this invention to provide a positive feeding structure with programmed spindle speed and control wherein, in the positive feeding structure preferred form and for maximum simplicity and efficiency, the spindle rotational speed control is effected by controlling the main fluid supply to a fluid driven motor rotatably driving the spindle so that a proportionate increase in the motor fluid supply will proportionally increase the spindle rotational speed and a proportionate decrease in the motor fluid supply will proportionally decrease the spindle rotational speed. In this preferred form, a speed regulating means is provided for the fluid driven motor which is selectively shiftable between various positions to proportionately and on a predetermined basis, increase or decrease the main fluid supply to the fluid driven motor. The previously discussed fluid valves controlled directly and exactly from the spindle axial movement may, therefore, be arranged directly controlling this fluid motor speed regulating means and permit the exact programmed control of the fluid motor and spindle rotational speed, as well as the spindle axial feed rate where the lead screw is likewise directly proportionately driven by the same fluid motor.

It is still an additional object of this invention to provide a positive feeding structure with programmed spindle speed control which results in a completely automatic positive feeding structure tool, the working cycle of which is totally programmable for presetting as desired and will be exactly and efficiently carried out, including preplanned varying spindle speeds and preferably also preplanned varying spindle axial feed, without more than superficial operator attention. For instance, a typical working cycle of the positive feeding structure might consist of the operator manually engaging the automatic controls with the spindle and lead screw fully retracted and "at rest" which begins immediate slow speed rotation of the spindle and lead screw, as well as air cylinder motivation of the spindle and lead screw in the initial portion of the axial feed stroke. As programmed, after the initial portion of the axial feed stroke, the control member automatically causes commencement of the lead screw control of the spindle feeding at the slow speed spindle and lead screw rotation and consequent slot feed, this followed by control member high-speed rotation and faster feed, ultimately returning to the slower rotation and slower speed shortly prior to the end of the feed stroke. At the end of the feed stroke, the control member disengages control of the lead screw and reverses movement of the spindle and lead screw, again by air cylinder motivation, moving the spindle and lead screw into and through the retraction stroke back to the starting position where the control member brings everything into the "at rest" condition ready for the manual starting of a subsequent cycle.

Other objects and advantages of the invention will be apparent from the following specification and the accompanying drawings which are for the purpose of illustration only.

Figure 1:
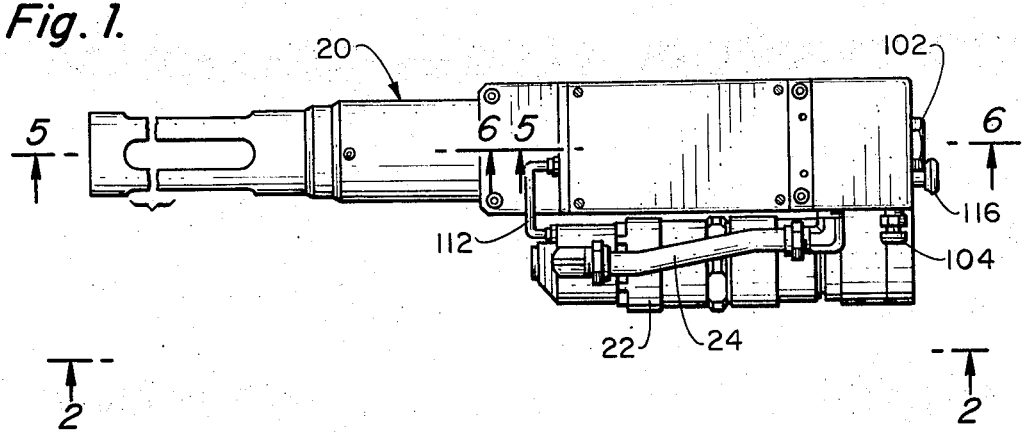
FIG. 1 is a fragmentary top plan view of an embodiment of a tool incorporating the positive feeding structure with programmed spindle speed control of the present invention, the spindle thereof being in fully retracted position.
Figure 2:
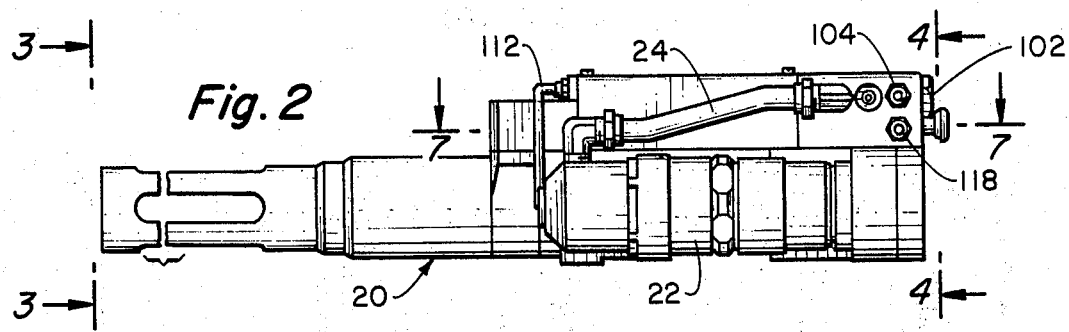
FIG. 2 is a fragmentary, side elevational view looking in the direction of the arrows 2—2 in FIG. 1.
Figure 3:
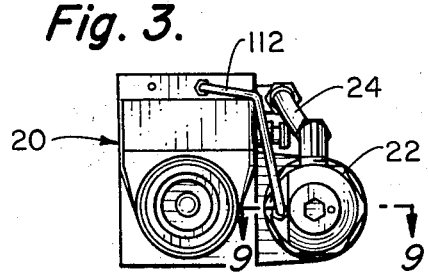
FIG. 3 is an end elevational view looking in the direction of the arrows 3—3 in FIG. 2.
Figure 4:
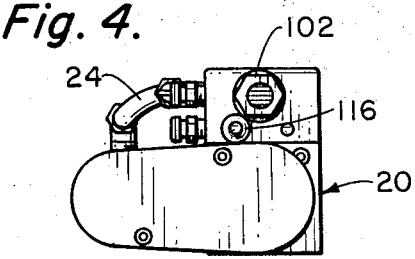
FIG. 4 is an end elevational view looking in the direction of the arrows 4—4 of FIG. 2.

DESCRIPTION OF THE BEST EMBODIMENT COMTEMPLATED:

Referring to the drawings, an embodiment of tool incorporating a preferred form of the positive feeding structure with programmed spindle speed control is shown and includes an encasing main frame generally indicated at 20 mounting a fluid driven, preferably air driven, drive motor generally indicated at 22. The fluid or air driven drive motor 22 is of a conventional form of the type wherein the amount of air supplied thereto for driving the same determines the speed of rotation, that is, a greater amount of air for higher rotation and a lesser amount of air for slower rotation. For purposes of the present invention to be later more fully explained, the air supply for the drive motor 22 is through a main air supply line 24 through a motor speed regulator generally indicated at 26, also to be hereinafter more fully described.

A rotatable drive shaft 28 of the drive motor 22 is connected through an appropriate gear train generally indicated at 30 to a spindle drive shaft 32 and then through other portions of said gear train to a lead screw drive shaft 34, all as best seen in FIGS. 5, 6 and 11 through 13. As particularly shown in FIG. 6, the spindle drive shaft 32 is connected to the gear train 30 axially stationary and is telescoped by a spindle 36 extending rearwardly slightly reduced and spline connected to the spindle drive shaft 32 for rotation therewith, but axial movement relative thereto. The lead screw drive shaft 34 is likewise axially stationary telescoping the rearward extension of the axially movable spindle 36 and is radially outwardly spline connected to a lead screw 38 for rotating the lead screw while permitting lead screw axial movement relative thereto.

Figure 5:
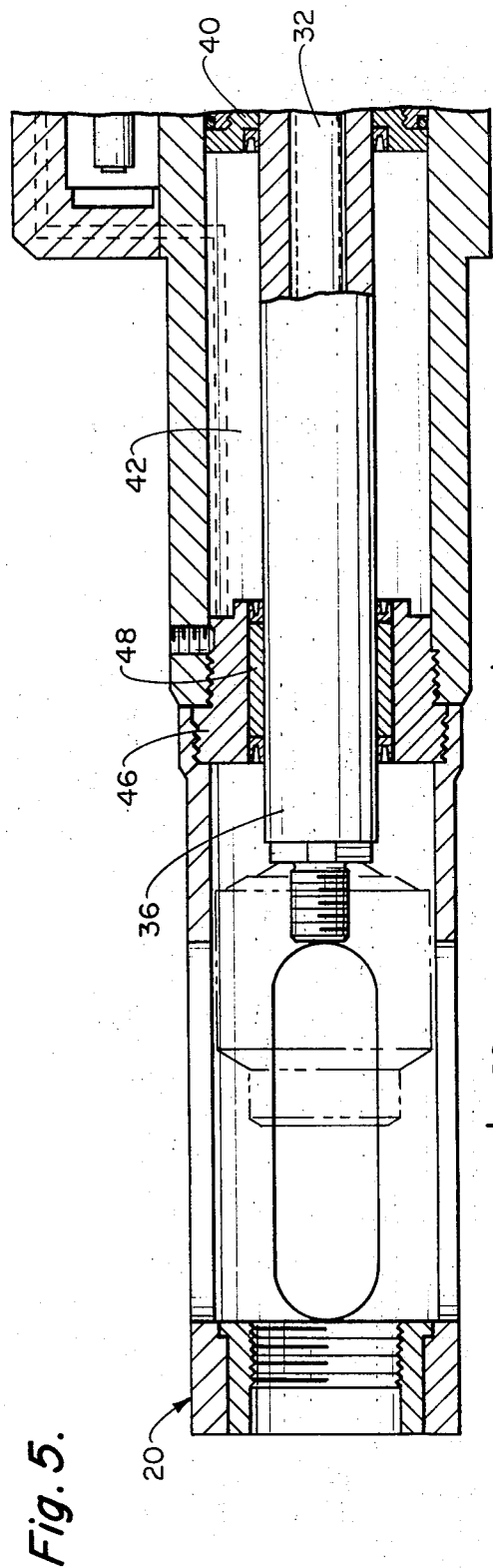
FIG. 5 is an enlarged, fragmentary, vertical sectional view looking in the direction of the arrows 5—5 in FIG. 1.

Threadably secured to the forward end of the lead screw 38 is a retraction stroke piston 40 axially slideable within a retraction stroke cylinder 42 formed in the main frame 20 and outwardly telescoping the spindle 36. Directly rearwardly of the retraction stroke piston 40 is a mounting bearing 44 secured between the spindle 36 and the lead screw 38 thereby providing rotation between the spindle and lead screw while tying them for common or simultaneous axial movement within the main frame 20. The forward end of the retraction stroke cylinder 42, as shown in FIG. 5, is closed by a cylinder head 46 secured in the main frame 20 and outward telescoping the spindle 36 through a sleeve bearing 48 which permits axial movement of the spindle therethrough while, through appropriate sealing, sealing off the retraction stroke cylinder 42. A feed stroke cylinder 50 is formed within the lead screw drive shaft 34 rearwardly of the spindle 36 and outwardly of the spindle drive shaft 32 with the rearward end of the spindle forming the piston therefor.

Figure 6:
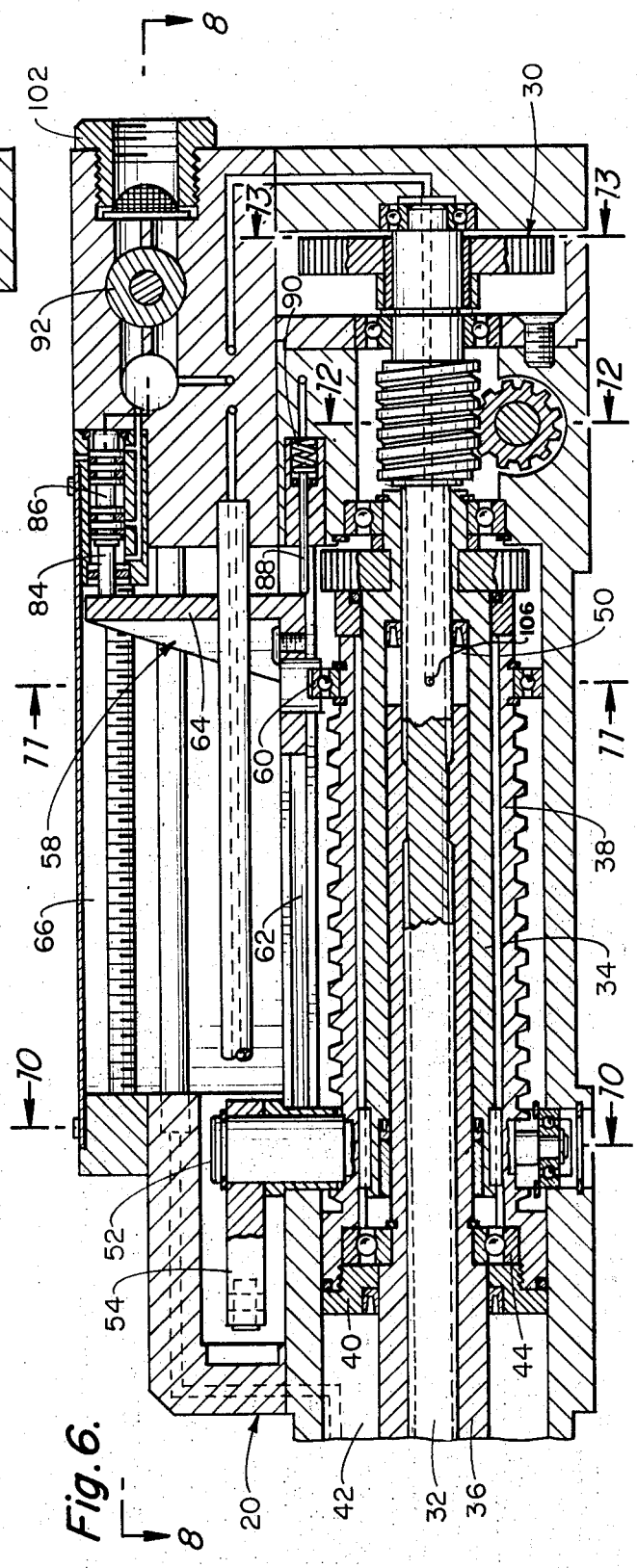
FIG. 6 is an enlarged fragmentary, vertical sectional view looking in the direction of the arrows 6—6 in FIG. 1.
Figure 7:
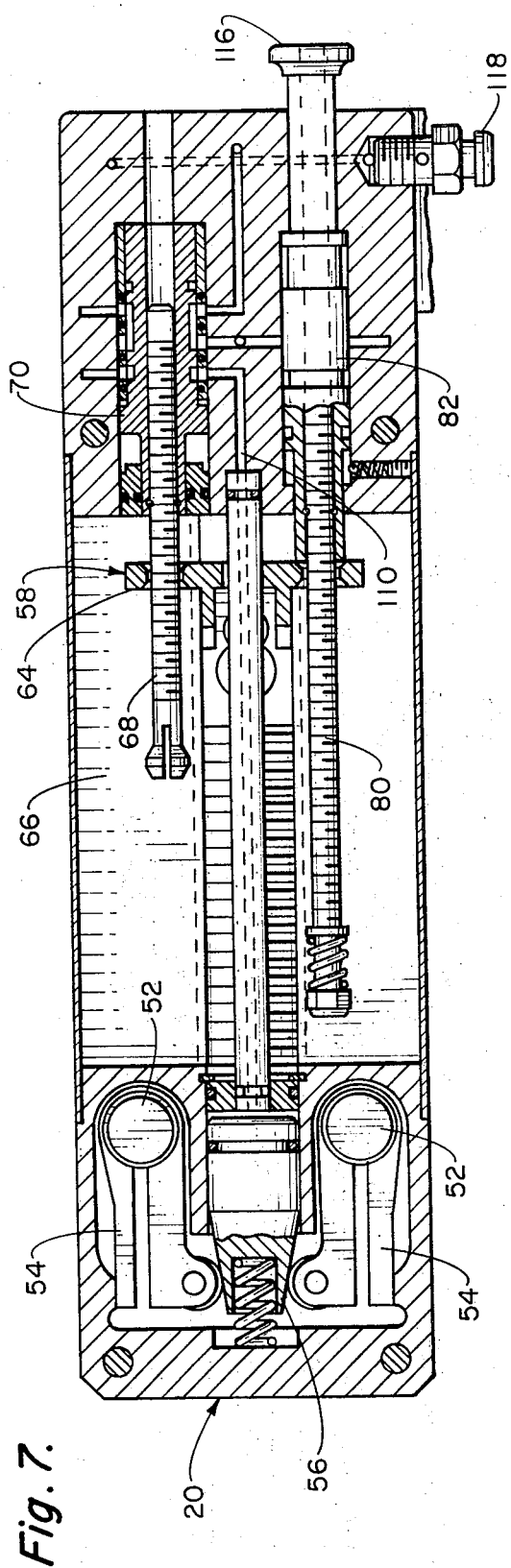
FIG. 7 is an enlarged, fragmentary, horizontal sectional view looking in the direction of the arrows 7—7 in FIG. 2.
Figure 10:
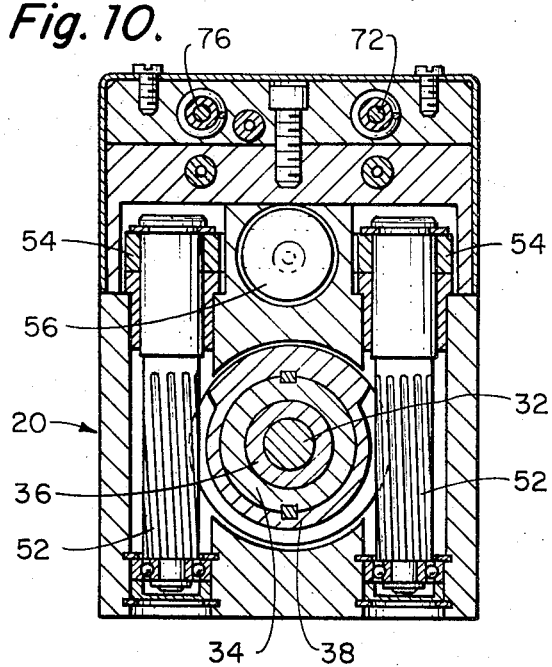
FIG. 10 is a vertical sectional view looking in the direction of the arrows 10—10 in FIG. 6.
Figure 11:
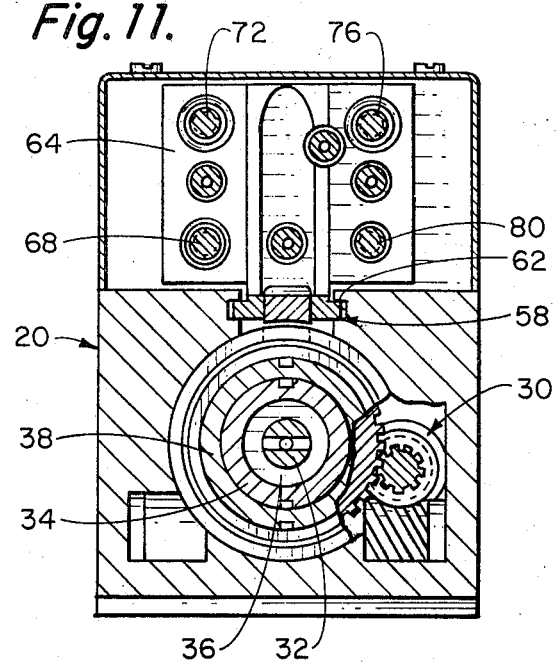
FIG. 11 is a vertical sectional view looking in the direction of the arrows 11—11 in FIG. 6.
Figure 12:
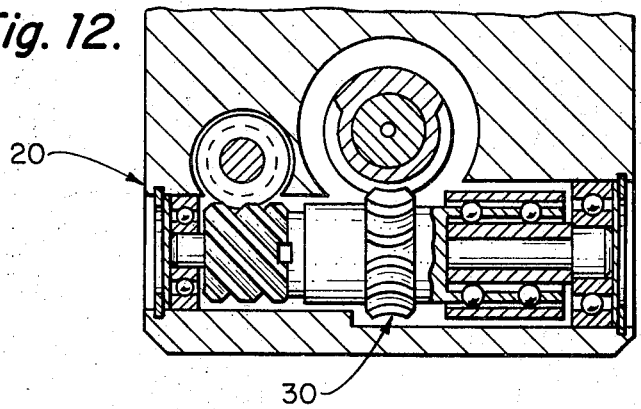
FIG. 12 is a fragmentary, vertical sectional view looking in the direction of the arrows 12—12 of FIG. 6.
Figure 13:
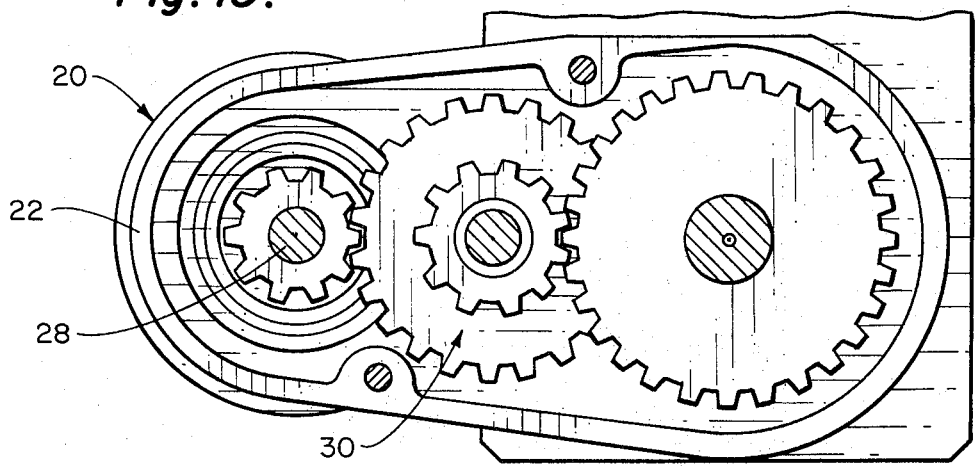
FIG. 13 is a fragmentary, vertical sectional view looking in the direction of the arrows 13—13 in FIG. 6.

As best seen in FIGS. 6, 7 and 10, a pair of lead screw nuts 52 are rotatably mounted in the main frame 20 engaged at all times with the lead screw 38 with the upper ends of the nuts being controlled by the split clutches 54. The clutches 54 are in turn controlled by a clutch actuator 56 normally spring actuated to non-actuating position and urged by air to actuating position and against such spring urging. Normally, therefore, with the clutch actuator in non-clutch actuating position as shown in FIG. 7, the lead screw nuts 52 may rotate freely as determined by the engagement of the nuts with the lead screw 38 and the rotation of such lead screw, but upon air under pressure being directed to the clutch actuator 56, the same is moved forwardly to compress the clutches 54 through the roller engagement therewith and cause the clutches to grip the lead screw nuts 52 retaining such nuts stationary.

Considering the overall assembly of the spindle 36 and the lead screw 38 within the main frame 20, air under pressure admitted to the feed stroke cylinder 50 will move the spindle and lead screw axially forwardly despite simultaneous rotation of the spindle and lead screw as long as the clutches 54 for the lead screw nuts 52 are not actuated and permit free rotation of the lead screw nuts 52. As soon as the clutch actuator 56 is energized by admitting air under pressure thereto and actuating the clutches 54 to grip the lead screw nuts 52 stationary, however, the lead screw 38 can only turn and feed axially exactly relative to the lead screw nuts 52 and will provide a controlled feed for the spindle 36 and lead screw 38, all still in the forward feed stroke movement of the spindle and lead screw. On the other hand, air under pressure admitted to the retraction stroke cylinder 42 will move the spindle 37 and lead screw 38 axially rearwardly in a retraction stroke despite continuous rotation of the spindle and lead screw, but the lead screw nuts 52 must, at this time, be freely rotatable as permitted by the clutches 54 being free of actuation, all of which will be more easily understood during a later description of the operation of the overall structure.

As shown in FIGS. 6 through 8 and 11, a control member generally indicated at 58 is secured to a rearward end of the spindle 36 for axial movement with the spindle by a mounting bearing 60, the control member 58 being retained rotatably stationary during rotation of the spindle by engagement in and guiding by an axially extending slot 62 of the main frame 20. That is, the control member 58 is secured axially moveable exactly with the spindle 36 by the connection thereto through the mounting bearing 60 with the mounting bearing otherwise sliding axially within the main frame 20. At the same time, the control member 58 is retained rotatably stationary despite rotation of the spindle 36 by being guided along the main frame slot 62, in this way, detecting exact axial movements of the spindle 36 and lead screw 38 while remaining rotatably stationary for translating these axial movements and motions to other elements of the positive feeding structure.

Figure 8:
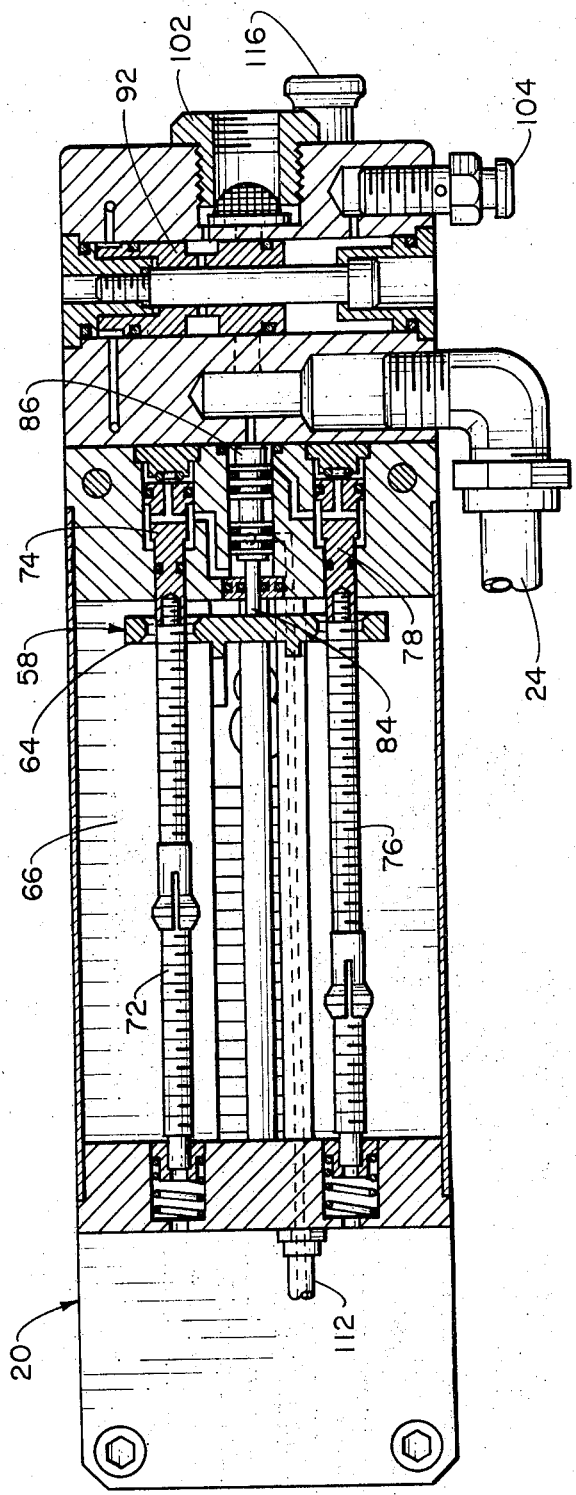
FIG. 8 is an enlarged, fragmentary horizontal sectional view looking in the direction of the arrows 8—8 in FIG. 6.

As shown, the control member 58 is generally L-shaped in cross-section so as to include a transversely or radially extending plate-like portion 64 projecting radially away from the spindle 36 and lead screw 38 into a control chamber generally indicated at 66 within the main frame 20. Within the control chamber 66, the plate-like portion 64 of the control member 58 by appropriate axial holes therethrough telescopes a collected actuator 68 of a clutch valve 70, a collected actuator 72 of a high-speed valve 74, a collected actuator 76 of a low-speed valve 78 and an abutment actuator 80 of a stroke reverse valve 81, all as shown in FIGS. 7 and 8. Also, the plate-like portion 64 of the control member 58 is positioned for axial abutment with an abutment actuator 84 of a speed regulator valve 86 as shown in FIGS. 6 and 8 and an abutment actuator 88 of a cycle end valve 90 as shown in FIG. 14.

Figure 14:
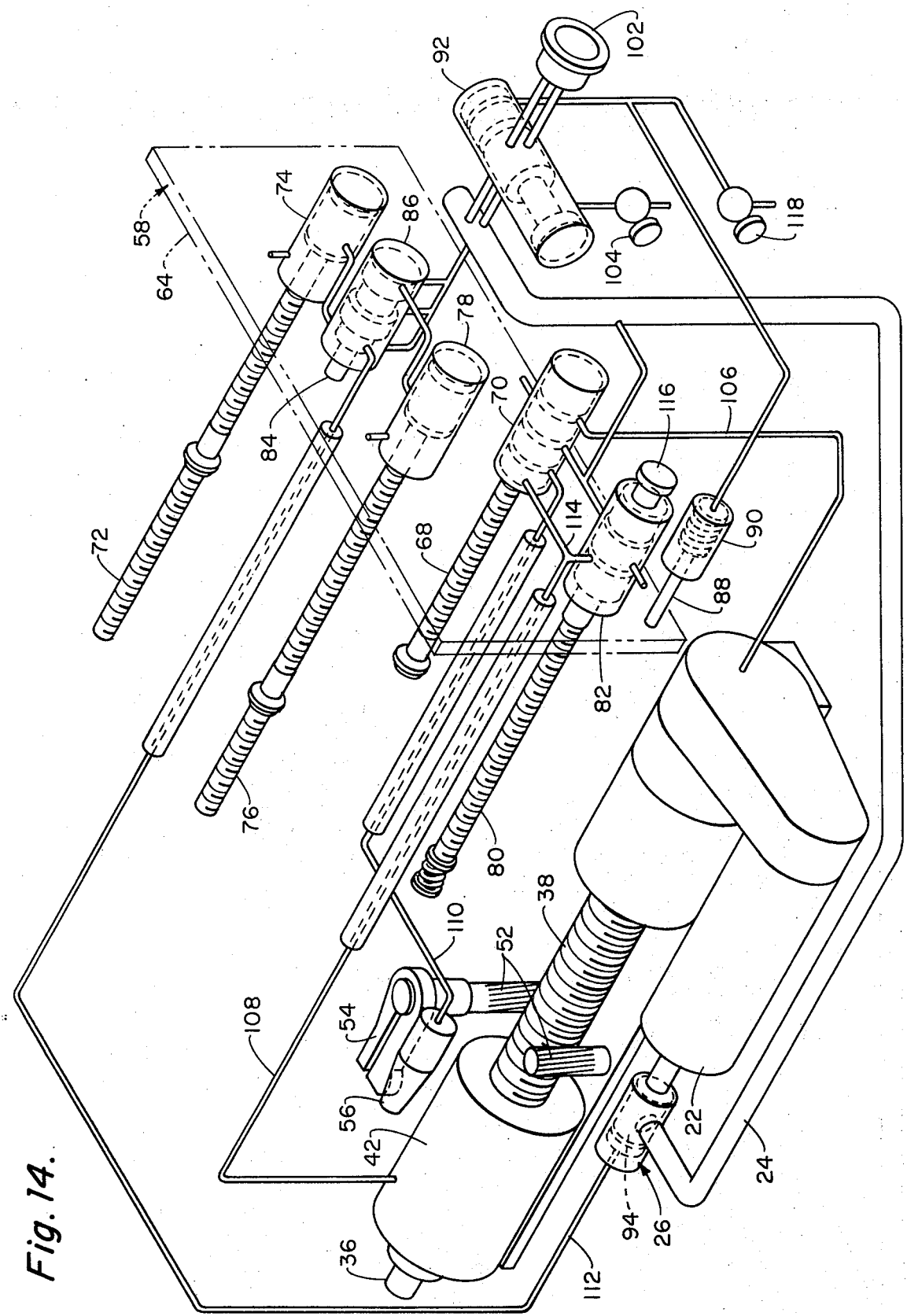
FIG. 14 is a diagramatic view illustrating the various control system elements and the fluid lines for fluid control thereby.

All of valves 70, 74, 78, 82, 86 and 90 are generally spool-type valves and comprise with a main control valve 92, shown in FIGS. 8 and 14, the fluid or air control valve system of the structure, all said valves being mounted within the main frame 20. All of these fluid valves are of generally usual form appropriate for performing the particular functions required thereof well known to those skilled in the art and for this reason, each of said valves will not be described in detail, but only certain of the modes of function thereof. Furthermore, the particular fluid or air line connections of the valves, certain to each other and certain to other elements of the structure, will be apparent upon a description of the sequential operation of the structure and will not be described in detail at this time.

As to the peculiarities of the various fluid valves and their connected actuators generally, various of these valves are arranged to be moved to each of two positions and will remain in such positions until moved to the other while various other of these valves are spring urged to one position and will be moved to the other position only as long as an exterior force is applied thereto, whether by temporary collected actuator engagement or abutment actuator engagement. Again, it is not necessary at this time to describe these peculiarities of functioning of the particular fluid valves, but such functioning will be described more in detail during a description of the overall operation of the structure.

Figure 9:
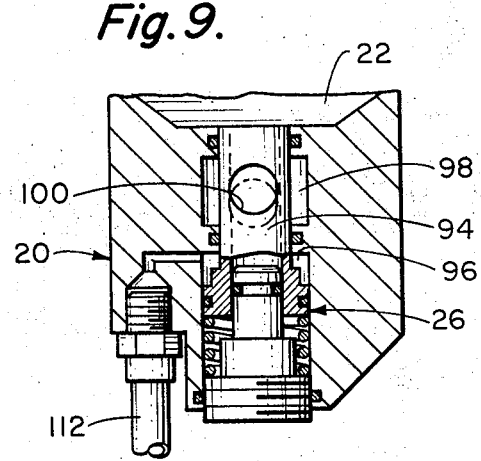
FIG. 9 is an enlarged, fragmentary, horizontal sectional view looking in the direction of the arrows 9—9 in FIG. 3.

The remaining fluid actuated element to be described more in detail is the previously mentioned motor speed regulator 26 which controls the main driving supply of air from the main air supply line 24 to the drive moor 22 for driving the same. Certain of the details of the motor speed regulator 26 are shown in FIG. 9 and illustrated diagramatically in FIG. 14. As shown in FIG. 9, the motor speed regulator 26 is in the high-speed position admitting a maximum of air from the main air supply line 24 therethrough and to the drive motor 22 for rotating the drive motor at maximum speed. The motor speed regulator 26 is generally of a well know form and, briefly, includes a reciprocal actuator 94 spring urged toward the drive motor 22 to a low-speed position, but urged to the high-speed position shown in FIG. 9 by the admission of air under pressure into a chamber 96 urging the actuator 94 away from the drive motor 22 and against the spring urging. The main air supply to the drive motor 22 enters the motor speed regulator 26 into an annular chamber 98 surrounding the actuator 94, into the actuator through an opening 100 and finally into the drive motor 22. Movement of the actuator 94 toward the drive motor 22 reduces the air admitted through the actuator 94 and thereby reduces the driving speed of the drive motor 22, while movement of the actuator 94 away from the drive motor 22 to the position shown in FIG. 9 admits a maximum of air therethrough and drives the drive motor 22 at high speed.

Prior to an explanation of the operation of the embodiment of positive feeding structure illustrated and described, it is important to point out that FIG. 14 is a diagramatic view showing the general arrangement of the fluid control valve system as related to the various elements to be controlled thereby, but the plate-like portion 64 of the control member 58 is merely shown in phantom lines and at a position with the spindle 36 and lead screw 38 fully rectracted, the latter showing being only illustrative of the fact that the control member plate-like portion is positioned to engage these various elements. During the description of the operation, the control member plate-like portion 64 will actually be described in its relative position.

Referring particularly to FIG. 14 and to other views as they become pertinent, in the "at rest" position the spindle 36 and lead screw 38 are fully retracted within the main frame 20 or to the left as shown in FIG. 5, 6 and 14 so that the control member plate-like portion 64 is fully retracted or to the left as shown in FIGS. 6 through 8. At the same time, as shown in FIG. 14, the main control valve 92 is positioned to the right (FIG. 8), clutch valve 70 to the right (FIG. 7), high speed valve 74 to the right through spring urging thereof (FIG. 8), low speed valve 78 to the right through spring urging thereof (FIG. 8), stroke reverse valve 82 to the right abutted by the control member plate-like portion 64 without spring urging (FIG. 7), speed regulator valve 86 to the right butted by the control member plate-like portion 64 without spring urging (FIGS. 6, 8) and cycle end valve 90 to the right abutted by the control member plate-like portion 64 against spring urging thereof. Still further, since no air is directed thereto, the clutch actuator 56 is not actuating the clutches 54 so that the lead screw nuts 52 are freely rotatable, the actuator 94 of the motor speed regulator 26 is under spring urging for low speed operation of the drive motor 22 and both the retraction stroke cylinder 42 an feed stroke cylinder 50 are free of operating effect continuously being exhausted of air (FIG. 6).

To start a cycle of operation of the positive feeding structure, a main air supply is directed through connection 102 (FIGS. 6, 8) and manual start button 104 is pressed exhausting air from the left-hand side of the main control valve 92 shifting this control valve to the left and admitting the main air supply into the main air supply line 24 and the speed regulator valve 86. Since the speed regulator valve 86 is to the right, no air will be admitted to the motor speed regulator 26 so that the same remains spring urged for low speed operation of the drive motor 22. The air supply within the main air supply line 24 directs air through the clutch valve 70 into the feed stroke cylinder 50 via line 106 without direction of air to the retraction stroke cylinder 42 which continues to exhaust through line 108 in view of the right-hand positioning of the clutch valve 70, and also through the motor speed regulator 26 into the drive motor 22 under the low speed setting of the motor speed regulator 26. Thus, drive motor 22 begins low speed rotation of the spindle 36 and lead screw 38 with the feed stroke cylinder 50 forcing the spindle and lead screw axially in the initial portion of the feed stroke.

As the initial portion of the feed stroke for the spindle 36 and lead screw 38 commences, the control member plate-like portion 64 immediately moves to the left away from abutment with all of the stroke reverse valve 82, speed regulator valve 86 and cycle end valve 90. In view of the lack of spring urging, the stroke reverse valve 82 and the speed regulator valve 86 remain in their right-hand positions. Due to spring urging, the cycle end valve 90 is immediately spring urged to its left-hand position but this positioning merely readies this cycle end valve for later operation and effect. As soon as the cycle end valve 90 has been cleared by the control member plate-like portion 64 for this left-hand shifting, the manual start button 104 can be released.

As the spindle 36 and lead screw 38 progress in this initial portion of the feed stroke carrying the control member plate-like portion 64, the control member plate-like portion merely moves along the respective actuators of the clutch 70, high-speed valve 74, low-speed valve 78 and storke reverse valve 82 without effecting or shifting positions of these valves. Ultimately, however, the control member plate-like portion 64 in its axial progress with the axial feeding of the spindle 36 and lead screw 38 as motivated by the feed stroke cylinder 50, engages the collected actuator 68 of the clutch valve 70 shifting the clutch valve 70 to the left and then releasing this actuator from such engagement by the passing of the collet portion thereof through the control member plate-like portion. The shifting of this clutch valve 70 to the left simultaneously exhausts line 106 to the feed stroke cylinder 50 and directs air through line 110 to the clutch actuator 56.

Air to the clutch actuator 56 moves the clutch actuator to the left to wedge against the clutches 54 and engage the same around the lead screw nuts 52 retaining these lead screw nuts 52 stationary. Since the spindle 36 and lead screw 38 are continuing to rotate at their slow speed, the lead screw is now controlled by its rotatable action against the stationary lead screw nuts 52 to begin a precisely controlled slow feed axially of the spindle 36 and lead screw 38. During this slow feed phase, the control member plate-like portion 64 continues to move axially exactly with the spindle 36 and lead screw 38 ultimately effectively engaging the colleted actuator 72 of the high-speed valve 74.

As the high-speed valve 74 is engaged, the high-speed valve is temporarily drawn to the left causing speed regulator valve 86 to be shifted to the left and after the colleted actuator 72 of the high-speed valve 74 has been released, this high-speed valve 74 shifts back to the right but the speed regulator valve 86 remains in its left shifted position. Shifting of the speed regulator valve 86 to the left, in turn, directs air into the line 112 and into chamber 96 of the motor speed regulator 26 urging the actuator 94 thereof into high-speed condition (FIG. 9). This results in full line air through the main air supply line 24 to be directed through the motor speed regulator 26 and to the drive motor 22 energizing it to high speed rotation for fast rotation of the spindle 36 and lead screw 38.

High speed rotation of the spindle 36 and lead screw 38 also causes the commencement of the fast feed phase of the spindle and lead screw feed stroke. In other words, since the feed is now being precisely regulated by the lead screw 38 acting against the stationary lead screw nuts 52, a higher speed rotation of the lead screw 38 will cause an increased axial feed rate for the spindle 36 and lead screw 38. This high speed rotation and fast feed continue until the control member plate-like portion 64 engages the collected actuator 76 of the low speed vavle 78 causing temporary shifting to the left of the low speed valve 78 against the spring urging of the colleted actuator 76 thereof.

During the temporary shifting to the left of the low speed valve 78, the speed regulator valve 86 is caused to shift back to the right cutting off air supply through the line 112 to the motor speed regulator 26 and shifting this motor speed regulator back to its low speed condition. Ultimately, the low speed valve 78 is released by the control member plate-like portion 64 and through its spring urging shifts back to the right, but the speed regulator valve 86 remains in its right shifted position so that the motor speed regulator 26 now directs a decreased air supply therethrough to the drive motor 22 for low speed operation thereof and both low speed rotation and axial feed of the spindle 36 and lead screw 38.

The slow speed of rotation and slow feed of the spindle 36 and lead screw 38 continues approaching the end of the feed storke fully extending the spindle 36 a maximum axial distance from the main frame 20. Ultimately, the control member plate-like portion 64 begins abutment engagement with the abutment actuator 80 of the stroke reverse valve 82 and against the spring cushioning thereof which shifts the stroke reverse valve 82 to the left simultaneously supplying air through the line 108 to the retraction stroke cylinder 42 and shifting clutch valve 70 to the right by air through line 114 to exhaust the line 110 deactuating clutch actuator 56. This releases the lead screw nuts 52 for free rotation and the retraction stroke cylinder 42 starts rearward or retraction movement of the spindle 36 and lead screw 38 despite the continued rotation thereof in view of the lack of control by the lead screw nuts 52.

The spindle 36 and lead screw 38 are carried by the retraction stroke cylinder 42 rearwardly throughout their retraction stroke ultimately to the fully retracted rearward or starting position in which the control member plate-like portion 64 comes into abutting engagement with the stroke reverse valve 82, speed regulator valve 86 and cycle end valve 90 shifting stroke reverse valve 82 to the right into its starting position, shifting the cycle end valve 90 to the right against the spring urging thereof, but having no effect on the speed regulator valve 86 since it is already in the right-hand position. Shifting of the stroke reverse valve 82 to the right cuts off air through the line 108 to the retraction stroke cylinder 42 ready for the start of another cycle and shifting of the cycle end valve 90 to the right exhausts air from the right-hand end of the main control valve 92 to shift the same to the right and shut off the main supply of air therethrough from the connector 102. This effectively terminates the cycle with all components placed in proper positions for the start of another cycle.

The foregoing has described a usual and ordinary complete cycling through complete feed and retraction strokes of the positive feeding structure of the present invention, but certain emergency controls are provided in the structure in the event unusual circumstances are presented which require that the usual cycle be interrupted. As shown in FIGS. 7 and 14, a manual reverse button 116 is provided on the stroke reverse valve 82 which may be manually depressed at any time during the feed cycle to move the stroke reverse valve to the left and immediately start the retraction stroke, the same being carried out in the same manner hereinbefore described. It it is found that the cycle must be interrupted and stopped immediately at any given point thereof, a manual stop button 118 as shown in FIGS. 8 and 14, may be manually depressed to immediately exhaust air from the right-hand side of the main control valve 92 cutting off the main supply of air to the structure and stopping the same.

According to the present invention therefore, a positive feeding structure of a preferred form has herein been described and illustrated and which incorporates a novel programmed spindle speed control, preferably both spindle speed of rotation and spindle axial feed speed control, and satisfying all of the objects thereinfore set forth. By such description and illustration, it is not intended to limit the principles of the present invention to the particular embodiment shown, but rather it is pointed out that the broad principles of the present invention can be readily adapted to various forms of similar structure, all intended within the inventive scope of the present invention.

I claim:

1. In a positive feeding structure for rotating and feeding tools and the like of the type having a rotatable spindle movable axially in a cycle of feed and retraction strokes, lead screw means operably connected to said spindle for axially moving and controlling said spindle during at least a working portion of said spindle feed stroke, and drive means for rotating said spindle; the improvements comprising: a control member operably connected and movable exactly with said spindle in said spindle feed and retraction strokes; fluid actuated speed regulating means operably associated with certain of said spindle, lead screw means and drive means actionable for shifting rotational speed of said spindle between various preset rotational speeds; fluid valve means operably engageable by said control member at preset locations of said control member and operably connected to said speed regulating means for actuating said speed regulating means to shift said spindle rotational speed at least twice during a cycle of said spindle and control member axial movement.

2. A positive feeding structure as defined in claim 1 in which said lead screw means is operably connected to said drive means rotatable directly proportional to said drive means rotation of said spindle; in which said fluid actuated speed regulating means is actionable for simultaneously shifting said rotational speed of said spindle and said proportional rotational speed of said lead screw means; and in which said fluid valve means is operably engageably by said control member at said preset locations of said control member for actuating said speed regulating means to shift both said spindle rotational speed and said lead screw means rotational speed at least twice during a cycle of said spindle and control member axial movement.

3. A positive feeding structure as defined in claim 1 in which said lead screw means is operably connected to said drive means rotatable directly proportional to said drive means rotation of said spindle; in which said fluid actuated speed regulating means is actionable for simultaneously shifting said rotational speed of said spindle and said proportional rotational speed of said lead screw means; in which said fluid valve means is operably engageable by said control member at said preset locations of said control member for actuating said speed regulating means to shift both said spindle rotational speed and said lead screw means rotational speed at least twice during a cycle of said spindle and control member axial movement; and in which said lead screw means includes a lead screw mounted coaxially with said spindle and movable axially with said spindle in said spindle feed and retraction strokes.

4. A positive feeding structure as defined in claim 1 in which said control member includes a generally radially extending plate-like portion movable axially exactly with said spindle in said spindle feed and retraction strokes.

5. A positive feeding structure as defined in claim 1 in which said lead screw means includes a lead screw mounted coaxially with said spindle and movable axially exactly with said spindle in said spindle feed and retraction strokes; and in which said control member is operably connected to said lead screw of said lead screw means rotatably stationary while movable axially exactly with said lead screw, said control member including a generally radially extending plate-like portion engageable with said fluid valve means.

6. A positive feeding structure as defined in claim 1 in which said lead screw means is operably connected to said drive means rotatable directly proportional to said drive means rotation of said spindle; in which said fluid actuated speed regulating means is actionable for simultaneously shifting said rotational speed of said spindle and said proportional speed of said lead screw means; in which said fluid valve means is operably engageable by said control member at said preset locations of said control member for actuating said speed regulating means to shift both said spindle rotational speed and said lead screw means rotational speed at least twice during a cycle of said spindle and control member axial movement; in which said lead screw means includes a lead screw mounted coaxially with said spindle and movable axially exactly with said spindle in said spindle feed and retraction strokes; and in which said control member is operably connected to said lead screw of said lead screw means rotatably stationary while movable axially exactly with said lead screw, said control member including a generally radially extending plate-like portion engageable with said fluid valve means.

7. A positive feeding structure as defined in claim 1 in which said drive means is a fluid driven drive motor; and in which said fluid actuated speed regulating means is operably associated with said fluid driven drive motor actionable for regulating a supply of fluid to said drive motor to shift rotational speed of said drive motor and thereby shift rotational speed of said spindle between said various preset rotational speeds.

8. A positive feeding structure as defined in claim 1 in which said fluid valve means actuates said speed regulating means to shift said spindle rotational speed from a preset slow rotational speed to a preset fast rotational speed to a preset slow rotational speed during said lead screw means control of said spindle.

9. A positive feeding structure as defined in claim 1 in which said fluid valve means actuates said speed regulating means to shift said spindle rotational speed from a preset slow rotational speed to a preset fast rotational speed to a preset slow rotational speed during said lead screw means control of said spindle; in which said drive means is a fluid driven drive motor; and in which said fluid actuated speed regulating means is operably associated with said fluid driven drive motor actionable for regulating a supply of fluid to said drive motor to shfit rotational speed of said drive motor and thereby shift rotational speed of said spindle between said various preset rotational speeds.

10. A positive feeding structure as defined in claim 1 in which said lead screw means is operably connected to said drive means rotatable directly proportional to said drive means rotation of said spindle; in which said fluid actuated speed regulating means is actionable for simultaneously shifting said rotational speed of said spindle and said proportional speed of said lead screw means; in which said fluid valve means is operably engageable by said control member at said preset locations of said control member for actuating said speed regulating means to shift both said spindle rotational speed and said lead screw means rotational speed at least twice during a cycle of said spindle and control member axial movement; in which said drive means is a fluid driven drive motor; and in which said fluid actuated speed regulating means is operably associated with said fluid driven drive motor actionable for regulating a supply of fluid to said drive motor to shift rotational speed of said drive motor and thereby shift rotational speed of said spindle between said various preset rotational speeds.

11. A positive feeding structure as defined in claim 1 in which said lead screw means is operably connected to said drive means rotatable directly proportional to said drive means rotation of said spindle; in which said fluid actuated speed regulating means is actionable for simultaneously shifting said rotational speed of said spindle and said proportional rotational speed of said lead screw means; in which said fluid valve means is operably engageable by said control member at said preset locations of said control member for actuaging said speed regulating means to shift both said spindle rotational speed and said lead screw means rotational speed at least twice during a cycle of said spindle and control member axial movement; in which said lead screw means includes a lead screw mounted coaxially with said spindle and movable axially with said spindle in said spindle feed and retraction strokes; in which said drive means is a fluid driven drive motor; and in which said fluid actuated speed regulating means is operably associated with said fluid driven drive motor actionable for regulating a supply of fluid to said drive motor to shift rotational speed of said drive motor and thereby shift rotational speed of said spindle between said various preset rotational speeds.

12. A positive feeding structure as defined in claim 1 in which said control member includes a generally radially extending plate-like portion movable axially exactly with said spindle in said spindle feed and retraction strokes; and in which said fluid valve means includes a series of fluid valves having rod-like extensions thereon projecting axially of said spindle and coaxially of openings through said control member plate-like portion engageable by said control member at said preset locations.

13. A positive feeding structure as defined in claim 1 in which said control member includes a generally radially extending plate-like portion movable axially exactly with said spindle in said spindle feed and retraction strokes; and in which said fluid valve means includes a series of fluid valves having rod-like extensions projecting therefrom axially of said spindle axial movement engageable by said control member plate-like portion to operate said valves, certain of said valves being aligned with said extensions thereof coaxial with openings in said control member plate-like portion with extension collet portions at preset extension positions temporarily engageable by said control member plate-like portion during said axial movement of said control member plate-like portion, certain other of said valves being aligned with said extensions axially abuttable by said control member plate-like portion at predetermined extremes of axial movement of said control member plate-like portion, said fluid valve means also controlling reverse axial movement of said spindle between said spindle feed and retraction strokes and termination of said spindle retraction stroke after a completion of said cycle of said spindle and control member axial movement.

14. A positive feeding structure as defined in claim 1 in which said control member includes a generally radially extending plate-like portion movable axially exactly with said spindle in said spindle feed and retraction strokes; in which said fluid valve means includes a series of fluid valves having rod-like extensions thereon projecting axially of said spindle and coaxially of openings through said control member plate-like portion engageable by said control member at said preset locations; in which said lead screw means is operably connected to said drive means rotatable directly proportional to said drive means rotation of said spindle; in which said fluid actuated speed regulating means is actionable for simultaneously shifting said rotational speed of said spindle and said proportional rotational speed of said lead screw means; in which said fluid valve means is operably engageable by said control member at said preset locations of said control member for actuating said speed regulating means to shift both said spindle rotational speed and said lead screw means rotational speed at least twice during a cycle of said spindle and control member axial movement; in which said lead screw means includes a lead screw mounted coaxially with said spindle and movable axially with said spindle in said spindle feed and retraction strokes; in which said drive means is a fluid driven drive motor; and in which said fluid actuated speed regulating means is operably associated with said fluid driven drive motor actionable for regulating a supply of fluid to said drive motor to shift rotational speed of said drive motor and thereby shift rotational speed of said spindle between said various preset rotational speeds.

15. In a positive feeding structure for rotating and feeding tools and the like of the type having a rotatable spindle movable axially in a cycle of feed and retraction strokes, lead screw means operably connected to said spindle for axially moving and controlling said spindle during at least a working portion of said spindle feed stroke, fluid driven drive motor means for rotating said spindle, and fluid supply means for supplying fluid to drive said drive motor means; the improvements comprising: speed regulating means operably associated with said drive motor and fluid supply means changeable for varying a supply of fluid to said drive motor means between preset rates to change rotatable speed of said drive motor means and thereby rotational speed of said spindle; fluid valve means operably connected to said speed regulating means and said spindle directly actionable by said spindle axial movements for changing said speed regulating means at least twice during a cycle of said spindle axial movement.

16. A positive feeding structure as defined in claim 15 in which said lead screw means includes a lead screw operably connected to said drive motor means rotatable by said drive means at a rotational speed a preset and constant proportion of said spindle rotational speed.

17. A positive feeding structure as defined in claim 15 in which said lead screw means includes a lead screw operably connected to said drive motor means rotatable by said drive motor means at a rotational speed a preset and constant proportion of said spindle rotational speed; and in which said lead screw of said lead screw means is positioned extending coaxially of said spindle and movable axially exactly with said spindle in said feed and retraction strokes.

18. A positive feeding structure as defined in claim 15 in which a control member is operably connected to and movable exactly with said spindle in said spindle feed and retraction strokes, said control member including a generally radially extending plate-like portion engaging said fluid valve means for said direct actuation of said fluid valve means by said spindle axial movements.

19. A positive feeding structure as defined in claim 15 in which a control member is operably connected to and movable exactly with said spindle in said spindle feed and retraction strokes, said control member including a generally radially extending plate-like portion engaging said fluid valve means for said direct actuation of said fluid valve means by said spindle axial movements; in which said lead screw means includes a lead screw operably connected to said drive motor means rotatable by said drive motor means at a rotational speed a preset and constant proportion of said spindle rotational speed; and in which said lead screw of said lead screw means is positioned extending coaxially of said spindle and movable axially exactly with said spindle in said feed and retraction strokes.

20. A positive feeding structure as defined in claim 15 in which a control member is operably connected to and movable exactly with said spindle in said spindle feed and retraction strokes, said control member including a generally radially extending plate-like portion engaging said fluid valve means for said direct actuation of said fluid valve means by said spindle axial movements; in which said lead screw means includes a lead screw operably connected to said drive motor means rotatable by said drive motor means at a rotational speed a preset and constant proportion of said spindle rotational speed; in which said lead screw of said lead screw means is positioned extending coaxially of said spindle and movable axially exactly with said spindle in said feed and retraction strokes; and in which said fluid valve means includes a series of fluid valves having axially extending rod-like extensions thereon engageable to operate sais valves, said valve extensions having means thereon at least temporarily engageable by said control member plate-like portion at preset locations during said movement of said spindle in said cycle of said spindle axial movement to carry out said changing of said speed regulating means at least twice during said cycle.

21. A positive feeding structure as defined in claim 15 in which a control member is operably connected to and movable exactly with said spindle in said spindle feed and retraction strokes, said control member including a generally radially extending plate-like portion engaging said fluid valve means for said direct actuation of said fluid valve means by said spindle axial movements; in which said lead screw means includes a lead screw operably conncted to said drive motor means rotatable by said drive motor means at a rotational speed a preset and constant proportion of said spindle rotational speed; in which said lead screw of said lead screw means is positioned extending coaxially of said spindle and movable axially exactly with said spindle in said feed and retraction strokes; in which said fluid valve means includes a series of fluid valves having axially extending rod-like extensions thereon engageable to operate said valves, said valve extensions having means thereon at least temporarily engageable by said control member plate-like portiom at preset locations during said movement to carry out said changing of said speed regulating means at least twice during said cycle, said fluid valve means including certain other fluid valves having axially extending rod-like extensions thereon engageable by said control member plate-like portion to actuate said valves, at least one of said certain other valves being operably connected to means associated with said spindle for terminating said spindle feed stroke and beginning said spindle retraction stroke, at least one of said certain other valves being operably connected to means associated with said spindle for terminating said spindle retraction stroke at a completion of said cycle of said spindle axial movement.

* * * * *